United States Patent [19]
Headley

[11] Patent Number: 5,346,298
[45] Date of Patent: Sep. 13, 1994

[54] CARTRIDGE RETAINING MEANS

[75] Inventor: James E. Headley, Whittier, Calif.

[73] Assignee: J. B. Engineering Co., Inc., Monrovia, Calif.

[21] Appl. No.: 33,281

[22] Filed: Mar. 16, 1993

Related U.S. Application Data

[63] Continuation-in-part of Ser. No. 662,211, Feb. 28, 1991, Pat. No. 5,193,891.

[51] Int. Cl.$^5$ .............................................. A47B 81/06
[52] U.S. Cl. .................................. 312/348.3; 312/9.54; 312/190
[58] Field of Search ...................... 312/9.48, 9.54, 9.56, 312/9.63, 187, 190, 348.3, 351

[56] References Cited

U.S. PATENT DOCUMENTS

| | | | |
|---|---|---|---|
| 2,170,586 | 8/1939 | Canfield | 211/184 X |
| 2,171,105 | 8/1939 | Wurzburg | 312/348.3 |
| 2,288,637 | 7/1942 | Mauro | 312/333 X |
| 3,298,538 | 1/1967 | Ganz et al. | 211/55 X |
| 3,612,292 | 10/1971 | Nervig | 211/184 |
| 3,811,745 | 5/1974 | Cylke | 312/13 |
| 3,868,018 | 2/1975 | Thies | 211/40 |
| 3,909,088 | 9/1975 | Dennehey et al. | 312/12 |
| 4,051,549 | 9/1977 | Fiege | 361/399 |
| 4,203,519 | 5/1980 | Fujitaki | 206/387 |
| 4,715,669 | 12/1987 | Baillie et al. | 312/12 |
| 4,815,598 | 3/1989 | Richter | 312/9.63 |
| 4,815,795 | 3/1989 | Accumanno et al. | 312/12 |
| 4,844,564 | 7/1989 | Price, Sr. et al. | 312/12 |
| 5,193,891 | 3/1993 | Headley | 312/348.3 |

*Primary Examiner*—Peter R. Brown
*Attorney, Agent, or Firm*—Christie, Parker & Hale

[57] ABSTRACT

A retaining bar is disclosed for retaining plural removable storage media cartridges in a spaced-apart relationship in a horizontal or vertical storage cabinet drawer. The retaining bar preferably comprises a molded rubber elongated strip which is press-fit onto an internal divider wall or an upper rail of a cartridge storage drawer or shelf. The strip has a generally inverted "U-shaped" cross-section defined by two spaced-apart horizontally elongated vertical walls each having top edges joined by a convex arcuate upper wall, and having bottom edges angled to receive the internal divider wall of the drawer. An inwardly-protruding shoulder is provided in the space between the strip walls, which shoulder prevents the strip from riding upward off the drawer divider or rail when the device is in use. One or more laterally outwardly-protruding retaining ribs are provided, each having plural compression notches thereon to enable the ribs to compress inwardly when contacted by cartridges in the drawer. Filing Vs of small or large angles can be achieved, even in the same row of cartridges.

19 Claims, 5 Drawing Sheets

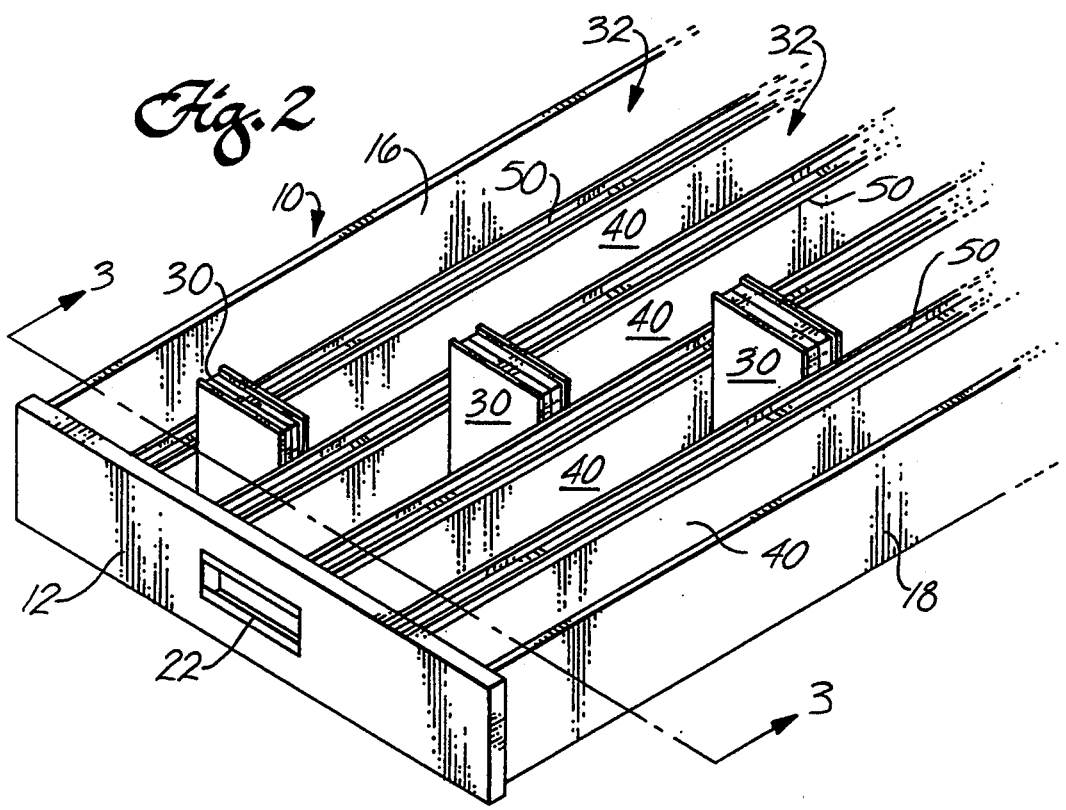
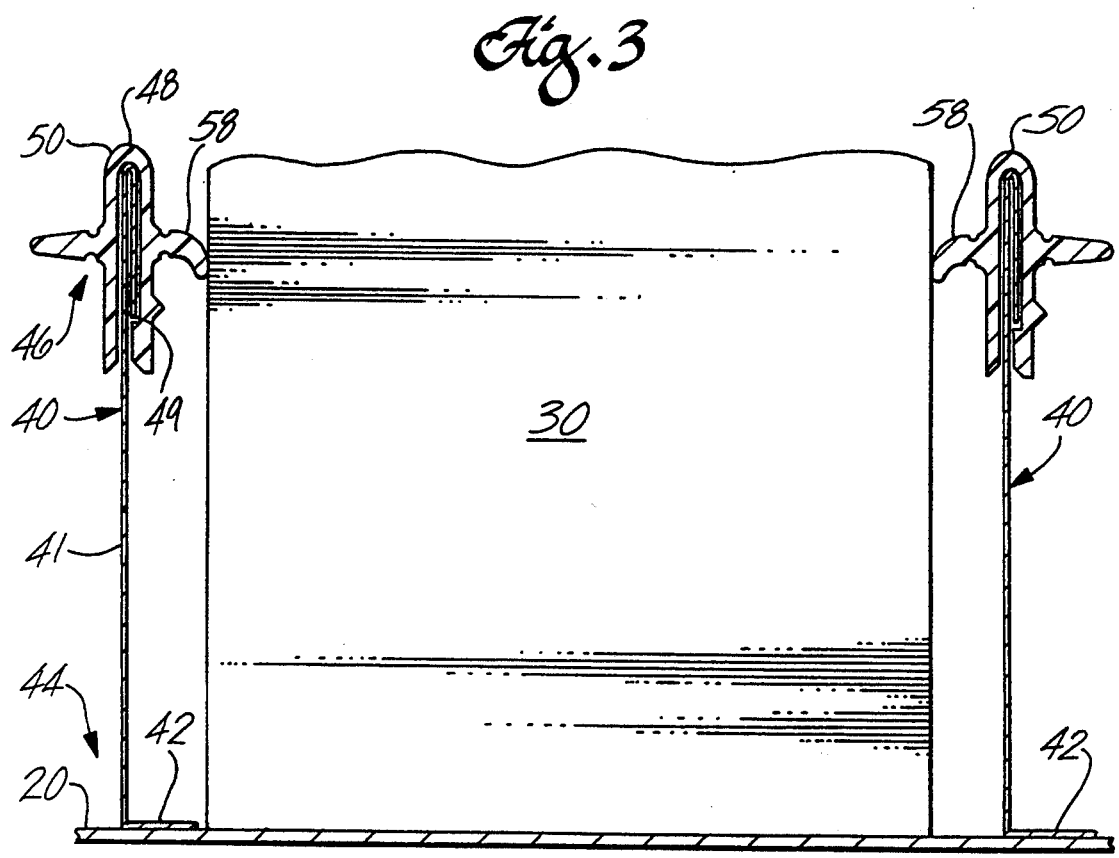

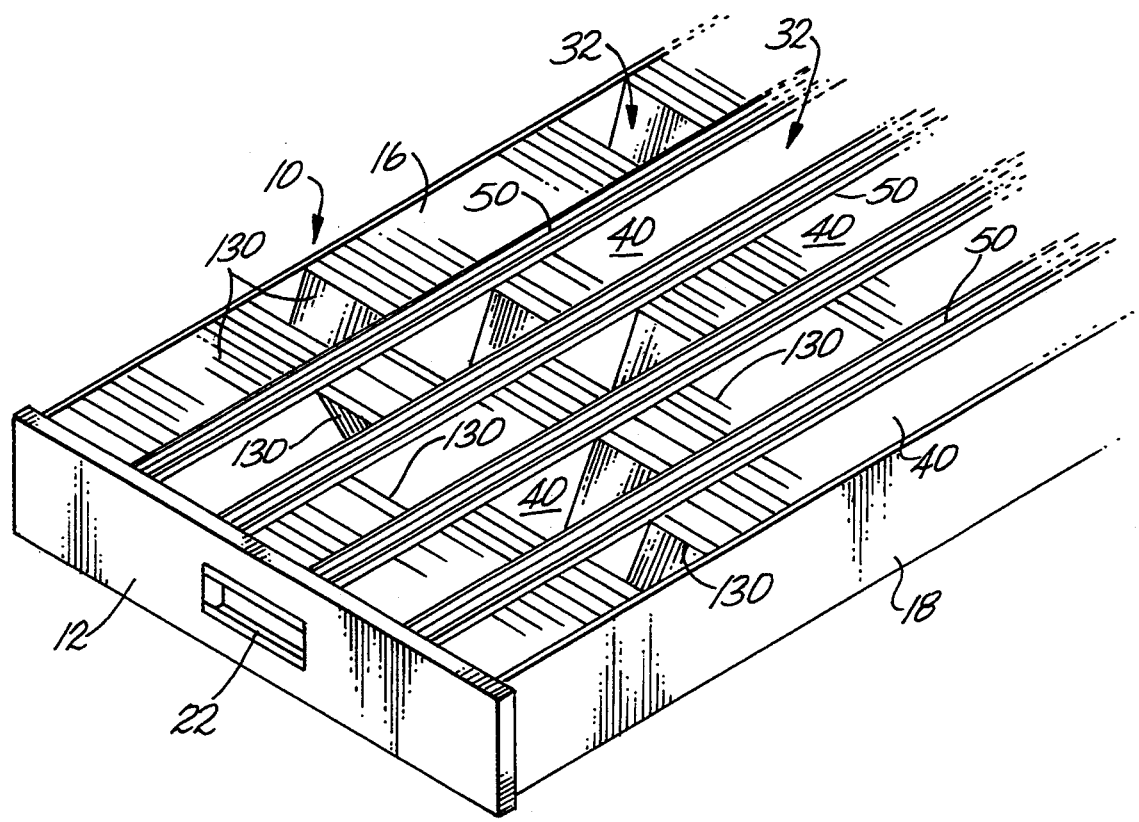

CARTRIDGE RETAINING MEANS

CROSS-REFERENCE TO RELATED APPLICATIONS

This is a continuation-in-part of copending application Ser. No. 07/662,211, filed Feb. 28, 1991 and issued as U.S. Pat. No. 5,193,891 on Mar. 16, 1993.

FIELD OF INVENTION

The present invention generally relates to means for retaining plural storage media cartridges in an upright orientation in a storage cabinet or drawer. The invention specifically relates to retaining bar means for retaining plural removable storage media cartridges in a spaced-apart relationship in a storage cabinet or drawer.

BACKGROUND OF INVENTION

Libraries, archives, Government offices, and other information-dependent institutions require large amounts of compact, organized storage facilities for media such as microfilm cartridges, tape cassettes, magnetic media or data cartridges. In the prior art such data storage media are often stored in horizontal or vertical stacks or rows arranged in large drawers or shelves. Often the stacks or rows are organized in chronological or numerical order for ease of filing and retrieval and to prevent loss or misfiling of individual cartridges. Other containers and holders including rigid and semi-rigid sleeves and envelopes are also stored in such facilities.

Unfortunately, this type of storage incorporates a serious disadvantage. Unless retention means are provided, when a single cartridge is removed from a row, the remaining cartridges will tend to slide and move together into the drawer, eliminating the space from which the cartridge was removed. As a result, returning the cartridge to its proper location in the drawer is difficult and time-consuming. First, the correct place for the cartridge must be located, and a space must be created by manually sliding the other cartridges apart.

Thus, a need exists for means to retain plural storage media cartridges or other storage containers in spaced-apart relationship so that when one cartridge is removed, a space remains between the other cartridges, facilitating return of the removed cartridge.

In the prior art this problem has been addressed in various ways. One way to retain cartridges in a spaced-apart relationship is to use biased or sprung retaining means which retain cartridges in place through spring tension acting on a cartridge. This approach is exemplified by U.S. Pat. Nos. 4,715,669 (Baillie et al.), 4,720,153 (Hatcher), 4,815,795 (Accumanno et al.), and 4,844,564 (Price, Sr. et al.).

However, this method requires relatively complex mechanical elements. Moreover, it is also desirable to provide such elements in a form which are easily retrofit to existing lateral cabinet drawers. One desirable way to provide retaining means which is easily retrofit to an existing drawer is to use an elongated strip, with friction retaining means incorporated therein, which can be secured to existing drawer internal dividers, walls, or rails.

In the context of printed circuit board support structures, a retaining bar is provided in U.S. Pat. No. 4,051,549 (Fiege). The device of Fiege comprises a retaining bar 18 secured to a frame member 15 and having plural notches 22, each notch being filled with a resilient material 21. When the edge of a circuit board 20 is forced against a notch 22, the board compresses material 21, retaining the board in place through the internal tension of material 21. However, the device of Fiege does not accommodate relatively thick data cartridges and is not intended to be retrofit to standard microfilm cartridge drawer structures. Fiege also requires use of a resilient material 21, such as soft neoprene, which raises the material and manufacturing costs of the Fiege device.

Thus, it is desirable to provide means to retain plural storage media cartridges or storage containers in spaced-apart relationship, so that when one cartridge is removed, a space remains between the other cartridges, facilitating return of the removed cartridge. It is further desirable to provide cartridge retaining means which is easily retrofit to an existing lateral cartridge drawer, which is inexpensive to manufacture, and which is mechanically simple in construction and operation.

It is also desirable that the means for holding a cartridge in place be able to engage and hold the cartridge at any desired angle, so that labeling on the cartridges can readily be seen. Traditionally, "filing Vs" are desirable in storage cabinets and have been achieved by using wire or rod dividers or tilt plates. These methods reduce the filing space because they add material between each stored cartridge or article. These methods also require a fixed angle to the V. Therefore, the overall capacity within a row, and visibility of each frontal surface of the articles in the row, is not optimal.

In prior methods, articles cannot be tilted from their set angle without having to manually hold them in place; otherwise, they slide or fall.

SUMMARY OF THE INVENTION

Accordingly, the present invention provides drawer and shelf means and retaining bar means for retaining plural removable storage media cartridges in a spaced-apart relationship in a storage cabinet drawer or shelf. The retaining bar means preferably comprises a molded resilient elongated strip which is press-fit onto an elongated support or rail of a lateral storage drawer. In cross-section, the strip is generally shaped as an inverted "U" defined by two spaced-apart horizontally elongated vertical walls each having top edges joined by an arcuate upper wall, and having bottom edges chamfered or angled to receive the internal divider wall of the drawer. An inwardly-protruding shoulder is provided in the space between the strip walls, which shoulder prevents the strip from riding upward off the drawer divider when the device is in use. Two laterally outwardly-protruding retaining ribs are provided, each having plural compression notches thereon to enable the ribs to compress inwardly when contacted by cartridges in the drawer and thereby hold cartridges in place through tension. Accordingly, the ribs, which contact the edges of each article and hold each article firmly in place, can hold the article at any angle within a range of angles, depending upon the dimension of the article and the positioning of the ribs.

Preferably, the opposing ribs in each drawer extend longitudinally and continuously along the length of the drawer, and have a relatively narrow cross section at their ends in relation to a length which the ribs laterally extend from the walls so as to provide narrow free ends for substantially linearly contacting and resiliently engaging the sides of the article so that the articles can be resiliently held at any desired angle or angles and loaded, unloaded, or moved in batches.

BRIEF DESCRIPTION OF DRAWINGS

FIG. 2 is a perspective view of a lateral storage cabinet drawer having strips of FIG. 1 mounted therein;

FIG. 3 is a partial section elevation of the drawer of FIG. 2;

FIG. 9 is a perspective view of the lateral storage cabinet showing some CD containers held therein so as to create a "filing V".

DETAILED DESCRIPTION

Figure 1A:
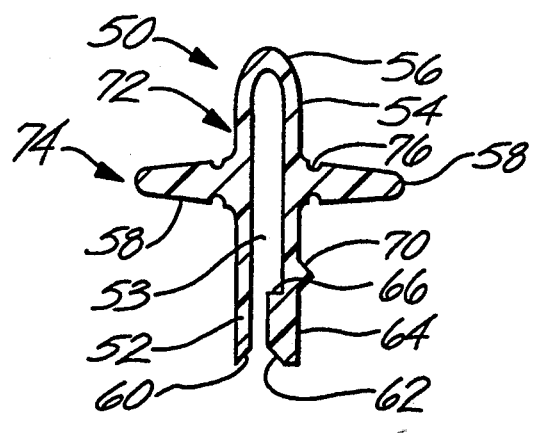
FIG. 1A is a cross-sectional view of a retaining strip of the present invention.

In the following detailed description of the preferred embodiments, specific terms are used for the sake of clarity. However, the invention is not limited to the specific terms so selected, but rather includes all technical equivalents using substantially similar structures performing the substantially the same functions in substantially the same way.

Referring now to the preferred embodiment of FIGS. 1 to 3, attention is first invited to FIG. 2, which shows a lateral storage cabinet drawer 10 comprising a front wall 12, a rear wall (not shown), side walls 16, 18, and floor 20. Each wall 12, 16, 18, and floor 20, is generally rectangular, as is known in the art, and is preferably constructed of sheet metal, such as sheet steel. The drawer 10 has an open top, and plural drawers 10 are usually arranged to slide in a closed cabinet structure (not shown). A handle 22 is provided in or on front wall 12 to enable sliding drawer 10 in and out of the cabinet.

Plural storage media cartridges 30 are placed in drawer 10 and preferably are organized as flat stacks or rows between retaining walls or rails 40. Plural channels 32 are defined by pairs of walls 40, or by one wall 40 spaced apart from side walls 16, 18. Thus, the channels 32 prevent side-to-side movement of cartridges 30, although in a conventional drawer, the channels 32 do not prevent front-to-rear sliding or movement of cartridges 30. However, a drawer of the present invention additionally includes plural elongated retaining strips 50 which are fitted on the top edge of walls 40, as shown in FIG. 2. The strips 50 will prevent front-to-rear sliding of cartridges 30 in the manner discussed below.

Strips 50 preferably comprise molded, high-impact, resilient rubber or plastic of two different types, as discussed below. As seen in FIG. 2, each strip 50 is elongated to run or cover the entire length of walls 40.

Structural details of one embodiment of strips 50 are shown in FIG. 1A. Each strip 50 comprises spaced-apart vertical left and right walls, designated 52 and 54, joined at their upper ends by a convex arcuate top wall 56. In the preferred embodiment, walls 52, 54, and 56 are integrally molded as a single unit in type RH600 rubber, preferably 0.030" thick; separate numeric designations are used herein only for the sake of clarity. The spaced-apart arrangement of walls 52, 54 define a central cavity 53 between walls 52, 54.

The bottom edges of walls 52 and 54 are each chamfered or angled to form angled edges 60, 62. Preferably, each angled edge 60, 62 is defined by an angle of 45 degrees, and edges 60, 62 are angled upwardly and inwardly toward cavity 53. The edges 60, 62 provide an open leading edge for strip 50 so that when the strip 50 is placed over a wall 40, the strip 50 can be pressed down quickly without misalignment on wall 40.

Right side wall 54 is additionally provided with a thick lower wall portion 64 having a top edge which defines an inwardly-facing shoulder 66. The shoulder 66 enables the strip 50 to lock on to wall 40, preventing strip 50 from riding upward or from being accidentally pulled upward off wall 40. As shown in FIG. 3, each wall 40 preferably comprises a vertical wall portion 41 joined, at a right angle, to a floor arm 42. The floor arm 42 is preferably welded or otherwise attached to floor 20 of drawer 10. Top end 46 of wall 40 is folded over to form a top strip 48 having a downwardly facing edge 49. When strip 50 is placed on wall 40, shoulder 66 will abut edge 49, preventing strip 50 from being pulled upward.

Right wall 54 additionally includes an outwardly-facing angled protrusion or lead 70, which functions to indicate the side of strip 50, in which shoulder 66 is located so as to enable orientation of strip 50 with shoulder 66 on the proper side of wall 40 so as to engage edge 49. In an alternate embodiment (see FIG. 1B), both side walls 52, 54 are provided with thicker lower wall portions, such as portion 64, and inwardly-facing shoulders, such as shoulder 66, so that strip 50 is always properly oriented when placed on wall 40. In this embodiment, the need for protrusion 70 is eliminated.

Figure 1B:
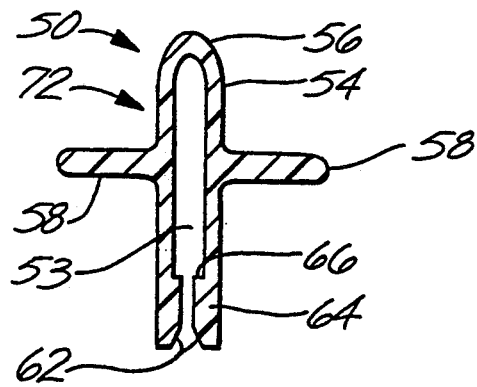
FIG. 1B is a cross-sectional view of an alternate embodiment of a retaining strip of the present invention.

Attention is again invited to FIG. 1 in which two outwardly-protruding retaining ribs 58 are shown secured to either wall 52, 54 of strip 50 at base end 72 of ribs 58. Ribs 58 preferably are constructed of type 62 rubber, which is more resilient and compressible than the type RH 600 rubber used for walls 52, 54, and 56, as is known in the art. Each base end 72 has a thickness greater than the terminal end 74 of each rib 58. Plural compression notches 76 are provided in ribs 58. The notches 76 enable ribs 58 to deflect and compress inwardly and downwardly when terminal end 74 is contacted by a cartridge 30 placed in the drawer 10 between strips 50. Notches 76 define the point of deflection of ribs 58, and such notches can be located adjacent to walls 52, 54 or placed at a more remote location along the lateral extent of rib 58. In an alternate embodiment, notches 76 are eliminated, and ribs 58 are molded in such a manner that they are thinner than shown in FIG. 1A and more uniform in cross section, as shown in FIG. 1B.

As shown in FIG. 3, ribs 58 protrude into channels 32 of the drawer 10 such that cartridges 30 are snugly press-fit between a pair of ribs 58. This press-fitting action is facilitated by the compression and partial deflection of ribs 58, which occurs when a cartridge 30 is placed between the ribs 58. In the two channels 32 located adjacent the edge of drawer 12, a single strip 50 is sufficient to retain the cartridges stored in those channels.

Thus, ribs 58 of strips 50 enable a drawer 10 to be filled with plural cartridges 30, each retained in place through tension provided by the resilient compression of ribs 58 against the side walls of a cartridge 30. The snug fit of the cartridges 30 holds the cartridges in place and prevents front-to-rear sliding of cartridges 30. Additionally, when a cartridge 30 is removed from the drawer 10 using strips 50 of the present invention, surrounding cartridges are retained in place and do not slide into the space left by the removed cartridge. Instead, each cartridge is retained in place so that when the drawer is opened later, the space from which a cartridge was removed is immediately apparent.

Figure 4:
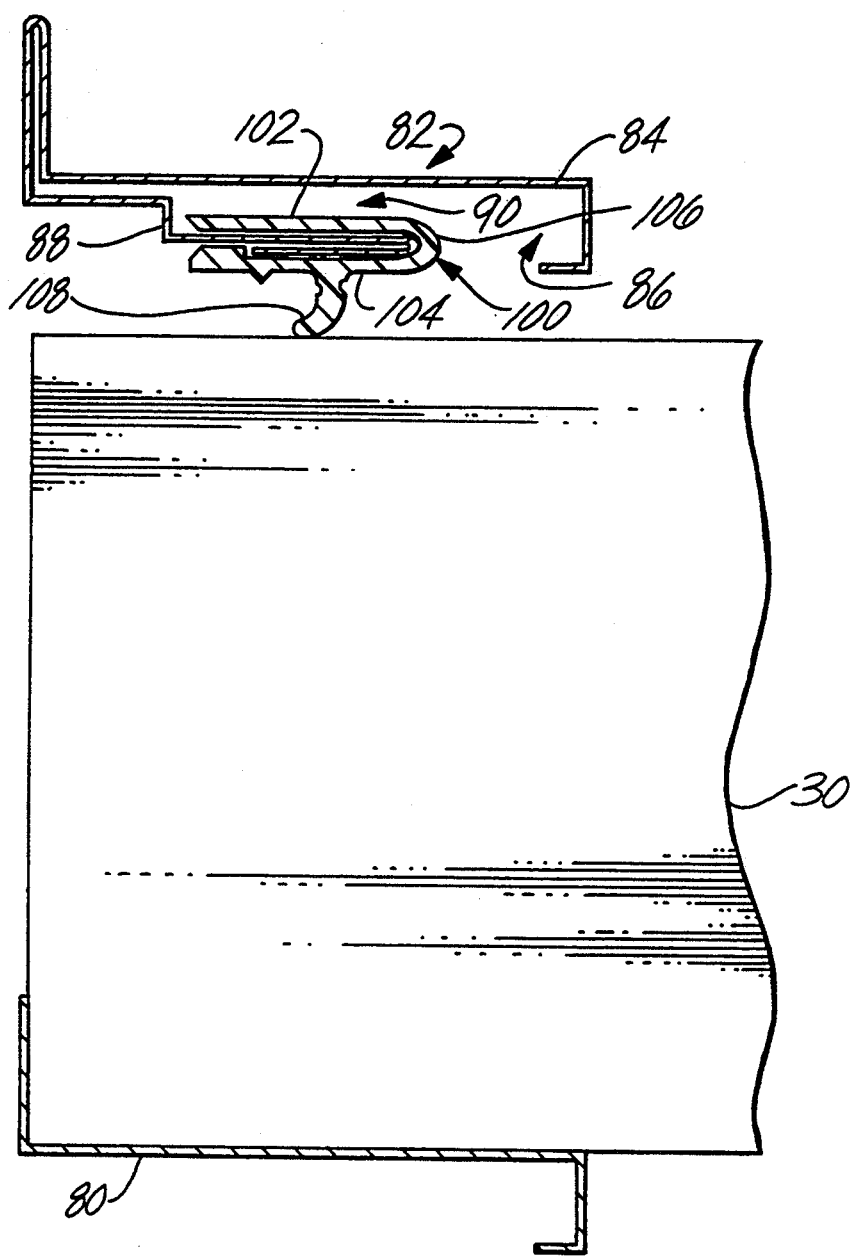
FIG. 4 is a partial section elevation of a horizontal shelf for receiving a plurality of storage cartridges in which the retaining strip is located above and extends transversely of the cartridges.

The present invention is also utilized with storage facilities utilizing horizontal shelves and vertically mounted drawers for holding cartridges on horizontal shelves mounted one above the other in such drawers. In FIG. 4 is shown a form of the invention as used to hold one of a plurality of storage cartridges on a horizontal shelf.

As shown therein, cartridge 30 is placed on shelf 80. A top shelf 82 is attached to a rear wall (not shown) of the storage cabinet. A shelf panel 84 is formed in wall 84 of an elongated sheet of material, such as metal, which has one lateral edge formed at 90° to the main sheet and with the terminal edge portion thereof being turned back over and parallel to panel 84 to form a recess 86. The end of wall 82 opposite recess 86 is formed to include an extension 88 which forms a recess 90 facing recess 86.

A strip 100 similar to strip 50 is mounted on extension 88 to provide the retaining means for cartridge 30. Strip 100 has side walls 102, 104 and a top wall 106 joining side walls 102, 104 defining a recess which receives extension 88.

A single retaining rib 108 is formed in wall 104 and extends vertically downward to engage the top of cartridge 30. In sliding cartridge 30 into position on shelf 80, rib 108 is compressed and deflected inwardly toward the rear wall of the facility. Cartridge 30 is representative of a plurality of cartridges mountable on shelf 80. Strip 100 extends the length of shelf 80, and rib 108 engages each cartridge which is placed thereon, holding them in position against inward or outward, as well as side-to-side movement, permitting easy storage and removal of each cartridge mounted side-by-side on the shelf.

Figure 5:
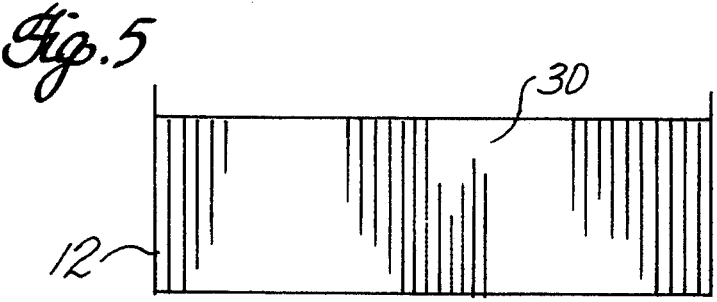
FIGS. 5–8 are schematic side views of a row of articles in a drawer showing how a "filing V" can vary when the invention is used.
Figure 6:
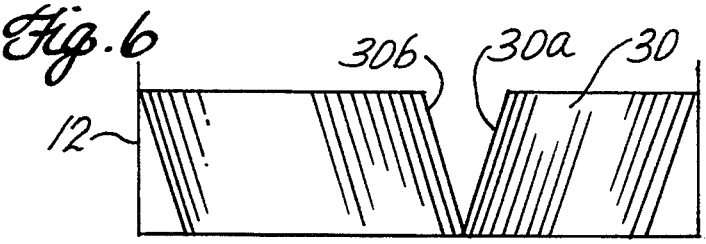
Figure 7:
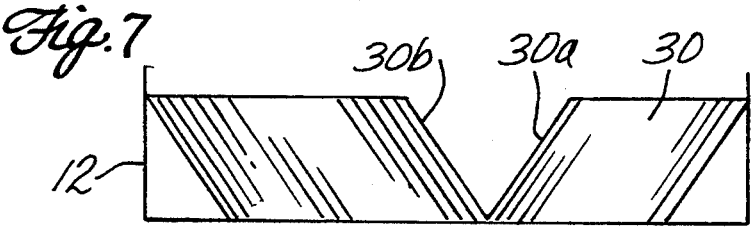
Figure 8:
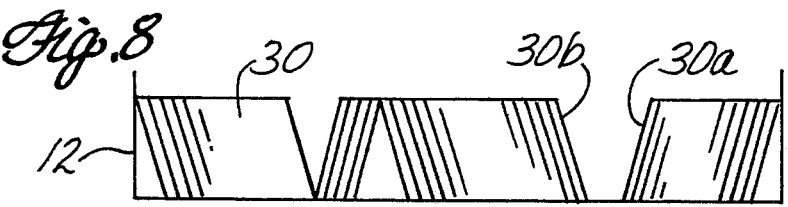

As shown in FIGS. 5-8, when the invention is used, the cartridges or other articles are gently and resiliently but securely held in place by their edges. When an article is removed, the other articles remain in place, regardless of how many articles are removed, or regardless of their angle with respect to the other cartridges or the vertical. When one wishes to view the frontal surface of a cartridge, one must flip through the cartridges. The angle between the cartridge with its frontal surface exposed, and the cartridge immediately in front it, is referred to as a "filing V." With the invention, various and multiple filing Vs can be achieved in the same row of articles. This is shown schematically in FIGS. 5-8. In particular, FIG. 5 shows no filing V, where the row is jammed full of cartridges. In FIG. 6, there is a relatively small filing V. When the frontal surface 30a of the exposed cartridge has been viewed, it can be flipped forward against the rear surface 30b of the cartridge in front of it. The thus-flipped cartridge will be held in place without having to manually hold it there. FIG. 7 shows a much larger filing V, and FIG. 8 shows how several filing Vs can be achieved.

Thus, when using the invention, nothing is between the cartridges, which allows for maximum storage without any filing V, if desired. Moreover, the invention allows for easy loading of articles in batches, because there is no need to individually fit them in slots or racks or between clips. The filing V can be varied, and multiple filing Vs can be achieved in the same row of articles. Therefore, the extent of frontal visibility of the articles is adjustable. All of these adjustments, sliding of articles or groups of articles, and loading of articles in batches is done without any changes to the cartridge retaining mechanism. This is achieved by maintaining gentle, but constant, pressure and friction against the edges of each cartridge. Therefore, a further advantage is that when the cartridges are flipped or scooted, they move under control in spite of the force of gravity.

It should also be noted that the invention works with a variety of thicknesses of articles, even if the articles within a row vary in thickness. Moreover, the invention works especially well with relatively thin cartridges or media, such as compact and optical disks, floppy diskettes, and other relatively thin cartridges.

FIG. 9 shows a perspective view of several CD containers 130, which are relatively thin, in a storage cabinet using the invention. A "filing V" can also be seen in FIG. 9. Some of the CD containers 130a are twice as thick as others, e.g., boxes which hold two disks.

The invention described above may be practiced in many other ways. For example, materials other than molded rubber are contemplated for strips 50 and ribs 58, such as lightweight, flexible plastics. Also, a drawer wall 40 may be constructed integrally with a strip 50. The disclosed structure for attaching the strip 50, comprising shoulder 66 and edge 49, may be changed, and other means for attaching strip 50 to wall 40 are contemplated such as by means of conventional fasteners, adhesives, or other means of mechanical securement. The invention is likewise adaptable to media or cartridges other than microfilm cartridges, such as cartridges or holders for all types of magnetic audio and data recording media including cassettes, tapes, floppy disks, CD containers, etc.

In view of the many possible variations on the present invention, the scope of the invention should be determined not from the specific structures disclosed above, but rather from the specific appended claims.

What is claimed is:

1. A storage cabinet drawer adapted for retaining plural cartridges in a spaced-apart relationship, the drawer comprising:
   a drawer floor;
   plural, substantially parallel, elongated channel walls attached to the floor; and
   at least two elongated retaining devices attached to adjacent channel walls, each device having a resilient rib extending longitudinally and continuously along a length of each wall and protruding laterally into the channel in opposing relationship and normal to each wall, wherein the opposing ribs each have free ends with a thin cross section in relation to a lateral length of the ribs to provide narrow free ends comprising means for substantially linearly contacting and resiliently engaging opposite side edges of cartridges therebetween for holding them in place.

2. The drawer of claim 1 wherein each rib further includes plural compression notches, enabling the ribs to be compressed.

3. The drawer of claim 1 wherein the retaining device comprises a first material which is resilient, and the channel walls and floor comprise a second material different from the first material.

4. A storage cabinet drawer adapted for retaining plural cartridges in a spaced-apart relationship, the drawer comprising:
 a drawer floor;
 plural, substantially parallel, elongated channel walls attached to the floor; and
 at least two elongated retaining devices attached to adjacent channel walls, each device having a resilient rib extending longitudinally and continuously along a length of each wall and protruding laterally into the channel in opposing relationship and normal to each wall, wherein the opposing ribs each have free ends having a thin cross section in relation to a lateral length of the ribs to provide narrow free ends comprising means for substantially linearly contacting and resiliently engaging opposite side edges of cartridges therebetween for holding them in place, whereby the cartridges may be disposed and held at varying orientations to a normal to the floor.

5. The drawer of claim 4 wherein the ribs are thicker adjacent the wall than at their free ends, and whereby two adjacent cartridges may be held in positions.

6. The drawer of claim 5 wherein the ribs are thicker adjacent the wall than at their free ends, and whereby there can be at least two pairs of adjacent cartridges in the same channel with one cartridge in the pair held in a position tilted away from the other cartridge in the pair.

7. Means for retaining plural cartridges in a longitudinally separated relationship, comprising an elongated strip having an elongated internal cavity defined by two spaced-apart elongated vertical walls and a top wall, and the two walls each having a longitudinally elongated, laterally-protruding compressible rib attached perpendicular to each vertical wall, extending continuously a length of each wall, and opposing each other, wherein the opposing ribs each have free ends having a thin cross section in relation to a lateral length of the ribs to provide narrow free ends for substantially linearly contacting and resiliently engaging the edges of a plurality of cartridges to hold the cartridges in place.

8. The means of claim 7 wherein the ribs are thicker adjacent the wall than at their free ends, and whereby the cartridges may be held in place against the force of gravity.

9. The means of claim 7 wherein the ribs are thicker adjacent the wall than at their free ends, and whereby the cartridges may be held in place at least two distinct angles within the channel.

10. A combination of a storage cabinet drawer and plural cartridges, the drawer adapted for retaining the plural cartridges in a spaced-apart relationship, the drawer comprising:
 a drawer floor;
 plural, substantially parallel, elongated channel walls attached to the floor to form channels therebetween; and
 at least two elongated retaining devices attached to adjacent channel walls, each device having a rib extending longitudinally and continuously along a length of each wall and protruding laterally into the channel in opposing relationship and normal to each wall, wherein the opposing ribs each have free ends having a thin cross section in relation to a lateral length of the ribs to provide narrow free ends substantially linearly contacting and resiliently engaging opposite side edges of the cartridges therebetween for holding them in place.

11. The combination of claim 10 wherein each rib further includes plural compression notches, enabling the ribs to be compressed.

12. The combination of claim 10 wherein the cartridges vary in thickness within the channel.

13. The combination of claim 10 wherein the retaining device comprises a first material which is resilient, and the channel walls and floor comprise a second material different from the first material.

14. A combination of a storage cabinet drawer adapted and plural cartridges, the drawer for retaining the plural cartridges in a spaced-apart relationship, the drawer comprising:
 a drawer floor;
 plural, substantially parallel, elongated channel walls attached to the floor to form channels therebetween; and
 at least two elongated retaining devices attached to adjacent channel walls, each device having a rib extending longitudinally and continuously along a length of each wall and protruding laterally into the channel in opposing relationship and normal to each wall, wherein the opposing ribs each have free ends having a thin cross section in relation to a lateral length of the ribs to provide narrow free ends substantially linearly contacting and resiliently engaging opposite side edges of the cartridges therebetween for holding them in place, wherein the cartridges may be disposed and held at varying orientations to a normal to the floor.

15. The combination of claim 14 wherein the ribs are thicker adjacent the wall than at their free ends, and whereby two adjacent cartridges may be held in positions tilted away from each other.

16. The combination of claim 15 wherein the ribs are thicker adjacent the wall than at their free ends, and whereby there can be at least two pairs of adjacent cartridges in the same channel with one cartridge in the pair held in a position tilted away from the other cartridge in the pair.

17. The combination of claim 14 wherein the cartridges are held in place against the force of gravity.

18. The combination of claim 14 wherein the ribs are thicker adjacent the wall than at their free ends, and whereby the cartridges may be held in place at at least two distinct angles within the channel.

19. The combination of claim 14 wherein the cartridges vary in thickness within the channel.

* * * * *

UNITED STATES PATENT AND TRADEMARK OFFICE
CERTIFICATE OF CORRECTION

PATENT NO. : 5,346,298
DATED : September 13, 1994
INVENTOR(S) : James E. Headley It is certified that error appears in the above-indentified patent and that said Letters Patent is hereby corrected as shown below:

Column 7, line 25, after "positions" insert -- tilted away from each other --.

Signed and Sealed this

Seventh Day of March, 1995

Attest:

BRUCE LEHMAN

*Attesting Officer*     *Commissioner of Patents and Trademarks*